US006076950A

United States Patent [19]

Topping et al.

[11] Patent Number: 6,076,950

[45] Date of Patent: Jun. 20, 2000

[54] INTEGRATED LIGHTING ASSEMBLY

[75] Inventors: Mark Stephen Topping, Lincoln Park; Michael G. Todd, South Lyon; Mark Miller, Monroe, all of Mich.

[73] Assignee: Ford Global Technologies, Inc., Dearborn, Mich.

[21] Appl. No.: 09/166,247

[22] Filed: Oct. 5, 1998

[51] Int. Cl.[7] .......... B60Q 1/00

[52] U.S. Cl. .......... 362/545; 362/245; 362/800

[58] Field of Search .......... 362/545, 240, 362/241, 245, 247, 800; 313/500

[56] References Cited

U.S. PATENT DOCUMENTS

| | | | |
|---|---|---|---|
| 4,345,308 | 8/1982 | Mouyard et al. | 362/245 |
| 4,965,488 | 10/1990 | Hihi | 313/499 |
| 5,038,255 | 8/1991 | Nishihashi et al. | 362/61 |
| 5,101,326 | 3/1992 | Roney | 362/61 |
| 5,161,872 | 11/1992 | Sasaki et al. | 362/29 |
| 5,471,371 | 11/1995 | Koppolu et al. | 362/32 |
| 5,490,049 | 2/1996 | Montalan et al. | 362/240 |
| 5,519,596 | 5/1996 | Woolverton | 362/250 |
| 5,632,551 | 5/1997 | Roney et al. | 362/249 |
| 5,660,461 | 8/1997 | Ignatius et al. | 362/241 |
| 5,673,995 | 10/1997 | Segaud | 362/83.3 |

*Primary Examiner*—Cassandra Spyrou
*Assistant Examiner*—Fayez Assaf
*Attorney, Agent, or Firm*—Roger L. May; Steve A. Maynard

[57] ABSTRACT

An integrated lighting assembly (10) includes an injection molded housing that has a base (12) with first fastening elements (22) molded thereon, a cover (18) with second fastening elements (24) molded thereon, and a substrate (16) intermediate the base and cover. An electrical circuit (30) is formed on the substrate and a lighting element (32) is attached to the electrical circuit. A reflective cone (34, 36) surrounds the lighting element to intensify its light and direct light through a diffuser lens (28) formed on the base. A reflective wall (26) on the base reflects light emanating from the diffuser lens in a predetermined pattern. Metal for the reflective surface and electrical circuit is deposited in a single operation. The base and cover are connected to the substrate by living hinges. When the cover is folded onto the base, the first and second fastening elements snap together to form a three dimensional lighting assembly.

20 Claims, 3 Drawing Sheets

INTEGRATED LIGHTING ASSEMBLY

FIELD OF THE INVENTION

The invention relates generally to a lighting assembly for use in a vehicle, and, more particularly, to a lighting assembly employing light emitting diodes in a molded reflective housing.

BACKGROUND OF THE INVENTION

In automobile manufacturing, light emitting diodes (LEDs) are replacing conventional filament bulbs in an effort to increase reliability, reduce space requirements and achieve greater aesthetic appeal. U.S. Pat. No. 5,471,371 which issued Nov. 28, 1995 to Koppolu et al. discloses a high efficiency illuminator for use with a light source such as an LED or light guide. The light source is positioned at the focal point of a reflector. A light wave reflected from the semiparaboloidal reflector strikes a secondary reflector which directs the light outward as useful light. A lens further shapes or directs the light as necessary. The illuminator is highly efficient, but is constructed using several different components that are assembled to form the illuminator. In manufacturing, it is desirable to have as few parts as possible to reduce the number of different parts to be manufactured and to minimize assembly time. Accordingly, it will be appreciated that it would be highly desirable to have a highly reliable, functional lighting assembly unit that is manufactured using a minimal number of components and manufacturing process steps.

SUMMARY OF THE INVENTION

The present invention is directed to overcoming one or more of the problems set forth above. Briefly summarized, according to one aspect of the present invention, an integrated lighting assembly has an injection molded housing which has a base, a cover and a substrate intermediate the base and cover. An electrical circuit is formed on the substrate, and a lighting element is attached to the substrate and receives power from the electrical circuit. A reflective cone associated with the lighting element intensifies light emanating from the lighting element. A diffuser lens formed on the base diffuses the intensified light, and a reflective wall on the base reflects the diffused light as desired.

The integrated lighting assembly is a single molding that snaps together to form a complete lighting assembly. The single piece construction reduces part count and reduces assembly time. Metal for the electrical circuit and reflective surfaces of the wall and cone is deposited in a single operation eliminating a need for a separate electronic circuit substrate. Lighting components are ultrasonically bonded to the metalized substrate providing superior mechanical properties. Electrically conductive polymers interconnect electrical components to the metalized substrate providing a similar coefficient of thermal expansion to prevent cracking or fatiguing of the joints. The integrated snap fit, living hinge and electrical connector features of the present invention eliminate discrete parts and associated assembly processes.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
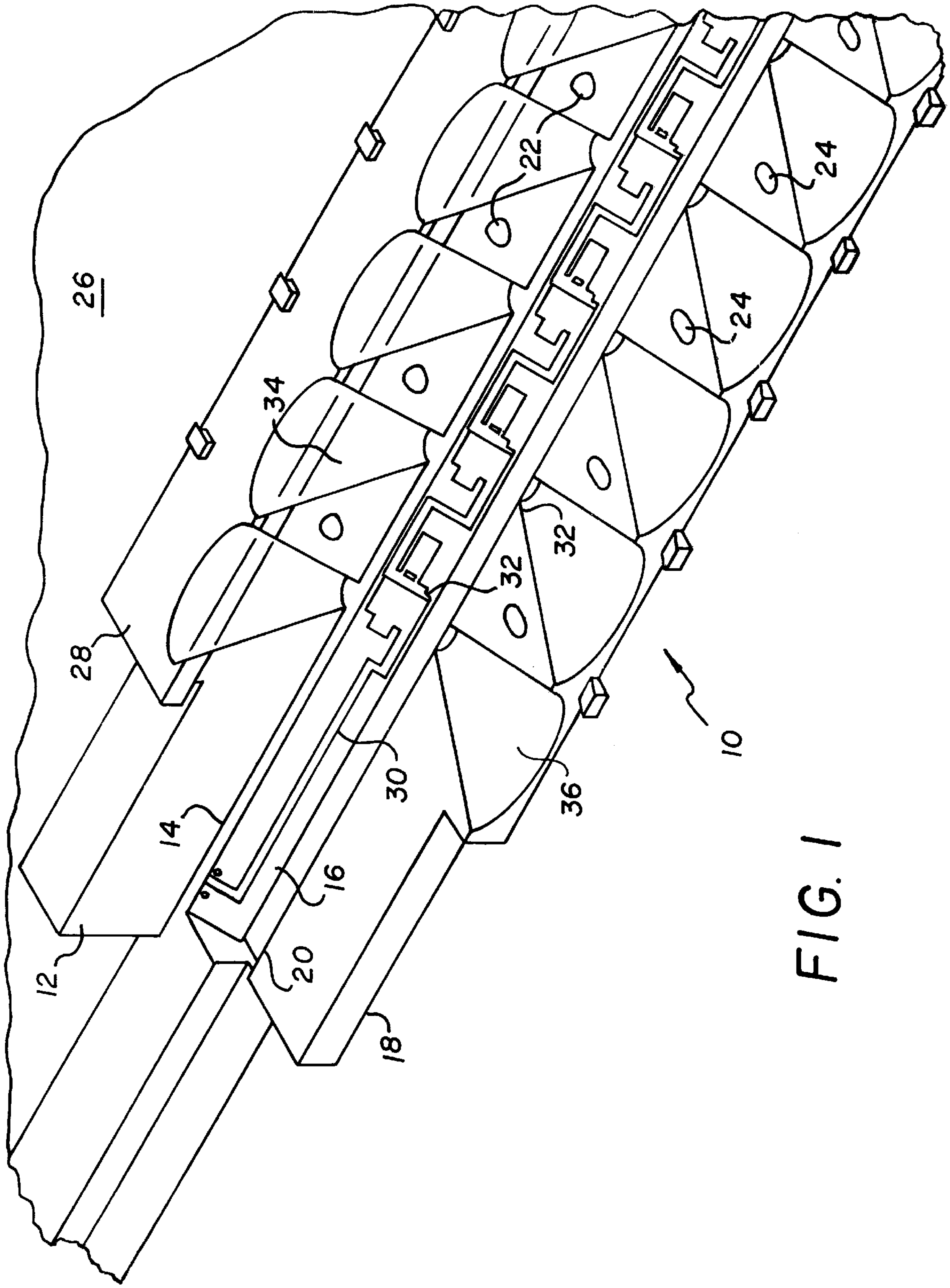
FIG. 1 is a diagrammatic plan view of a preferred embodiment of an integrated injection molded automotive lighting assembly according to the present invention with the housing open.
Figure 2:
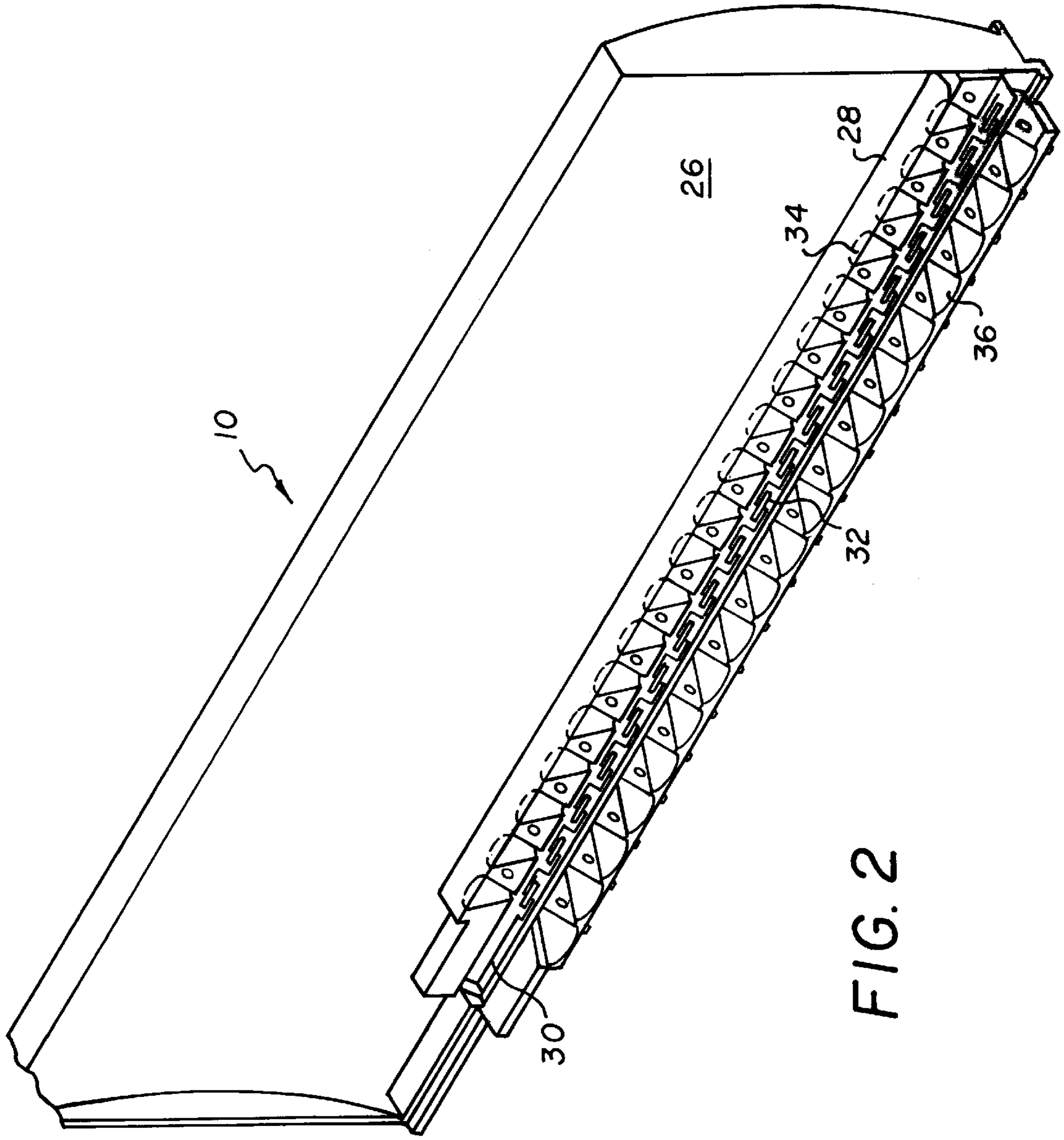
FIG. 2 illustrates the lighting assembly with the cover partially closed and a full reflective wall.
Figure 3:
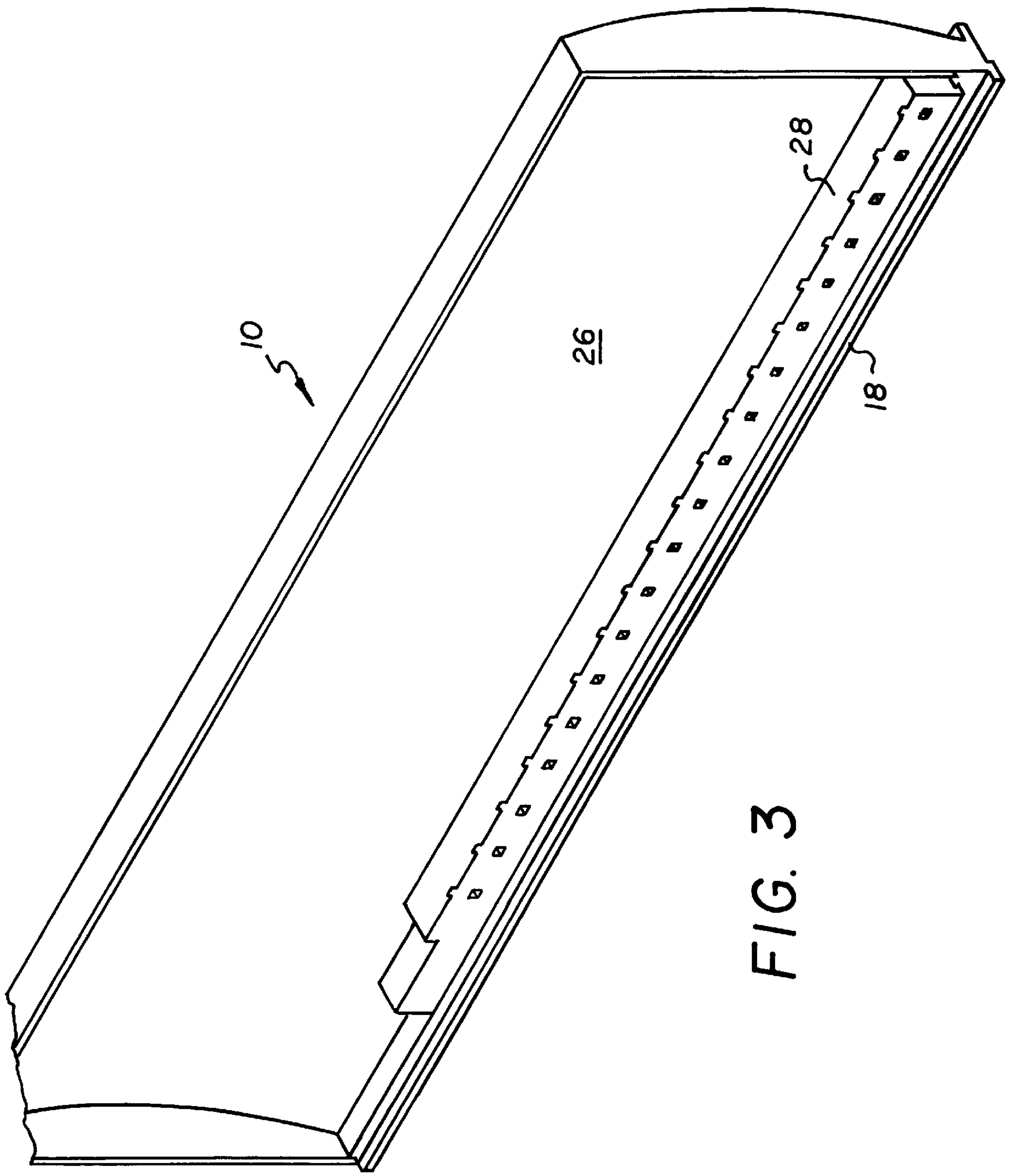
FIG. 3 illustrates the lighting assembly with the cover closed.

Referring to FIGS. 1–3, an integrated lighting assembly 10 uses an injection molded housing that is essentially a two dimensional molded object that is folded up into a three dimensional lighting assembly. The housing is preferably molded using a thermoplastic material such as polypropylene with 20% talc filler to improve heat conductivity and mechanical properties. The molded housing has a base member 12 that is pivotally attached by a first hinge 14 to a central substrate 16, and the substrate 16 is pivotally attached to a housing cover 18 by a second hinge 20. Hinges 14 and 20 may be thin molded sections flexible enough to allow members on either side to move and are called living hinges which are well known in the art. The housing members are molded in one piece and folded along the hinges into the three dimensional structure so that cover 18 overlays base 12. Base member 12 has first fastening elements 22 molded thereon, and housing cover 18 has second fastening elements 24 molded thereon. Fastening elements 22 and 24 preferably snap together when the housing is folded up from a two dimensional structure into the completed three dimensional structure. Base member 12 has a larger area than cover 18 with the uncovered portion of base 12 coated to become an optically reflective wall 26. Preferably the wall 26 is coated with a layer of metal using an evaporative metal deposition process. Base member 12 also has a lens 28 molded thereon which lies between the reflective wall 26 and the first hinge 14.

An electrical circuit 30 is formed on the central substrate 16 by evaporative metal deposition at the same time that the metal is deposited forming the reflective wall 26. Lighting elements, such as LEDs 32 are positioned on the substrate and connected to the electrical circuit 30 to receive power for operation. The LEDs 32 and other discrete electrical components are mechanically secured to the substrate using ultrasonic welding. Electrical connections are made using electrically conductive adhesive between the electrical conductor traces of the circuit and the components. Using electrically conductive adhesive allows electrical interconnection between the deposited electrical conductor traces and the electrical components at a temperature that is well below that for typical solder reflow temperatures thereby allowing the use of low cost thermoplastic molding materials.

Light from each of the LEDs is intensified by a reflective cone. Each cone has a first cone section 34 formed in base member 12 adjacent the first hinge 14, and has a second cone portion 36 formed in cover 18 adjacent the second hinge 20. When the cover is snapped onto the base, each pair first and second cone sections 34, 36 form a cone about one of the LEDs. The cone intensifies the LED light and directs it to the diffuser lens 28 which directs it to the reflective wall where it is reflected for its intended use. The cone sections are also coated with a reflective layer just as the reflective wall is coated, and they are coated along with the reflective wall.

It can now be appreciated that an integrated lighting assembly and method for forming the integrated automotive lighting assembly have been presented. The method for forming the integrated automotive lighting assembly comprises forming a housing by injection molding a thermoplastic material. The housing has a base with plurality of first fastening elements formed thereon, a cover with a plurality of second fastening elements thereon, and a substrate intermediate the base and cover. The first and second fastening elements are mateable with one another to fasten the cover to the base. The method also includes forming a diffuser lens on one of the base and cover while forming the housing, and selectively depositing metal onto the housing and forming an electrical circuit on the substrate, a first reflective cone section on the base, a second reflective cone section on the cover, and a reflective wall on the base. The method also includes connecting a lighting element to the electrical circuit, and folding the cover onto the base causing the first and second cone sections to form a cone about the lighting element and causing the first and second fastener elements to mate.

The integrated lighting system is composed of a single assemblage that, when sections are snapped together, makes up a complete unit. This unit is comprised of a low temperature, injection molded housing formed of a material such as 20% talc filled polypropylene. It incorporates the three dimensional assembly housing, light projecting features, living-hinge joints and snap-fit interconnects. Electrical circuit patterns required to provide power to the lighting components and the reflective surfaces required for the optical properties of the unit are created simultaneously using conventional evaporative metal deposition techniques. The electrical circuit patterns are defined by masking the substrate as required during vapor deposition of the metal onto the plastic substrate. The lighting elements and other electronic components are then ultrasonically bonded to the plastic substrate to form a robust mechanical joint. Electrical interconnection to the evaporative plated circuit is achieved by using polymer based conductive adhesive. The combination of mechanical and electrical component attachment provides a very reliable interconnection between the components and the substrate while allowing the use of very low temperature, low cost materials such as polypropylene or acrylonitrile-butadiene-styrene (ABS). The integrated lighting assembly is then folded using the two living hinges to form the reflective housing around the lighting elements. The integrated assembly reduces part count, complexity and cost.

It can now be appreciated that a simple, integrated lighting assembly has been presented that takes advantage of several complimentary technologies. The assembly uses a single injection molded housing with living hinge joints and integrated snap-fit connectors to form a complete three dimensional housing. Evaporative metal deposition is used to form both the optically reflective surfaces and electrical conductors required for powering the LEDs. Ultrasonic component welding of the LEDs and discrete electrical components is used to mechanically secure these parts while electrically conductive adhesives are utilized to provide electrical interconnection between the deposited electrical conductor traces and components at a temperature well below typical solder reflow temperatures. The integrated assembly uses conventional substrate materials and results in dramatic reduction of parts count and assembly processes while improving product reliability and cost.

The integrated assembly design uses a single substrate to provide mechanical, optical and electrical features. The result is the elimination of separate circuit boards, wiring, connectors, fasteners and internal housings. An assembly parts count and overall cost reduction is realized while improving reliability by eliminating electrical and mechanical interconnections and by improving the mechanical fastening of critical electronic components. The single metalization process provides both electrical and optical coatings on the single assembly. This feature eliminates the need for a separate electronic circuit substrate. Ultrasonic component attachment to the assembly substrate provides superior mechanical properties of the lighting elements. Conductive adhesive electrical interconnection of the lighting elements to the metalized substrate provides a robust interconnection which is matched well in properties to the substrate in that there is a similar coefficient of thermal expansion which prevents cracking or fatiguing of the joints. The integrated snap fit, living hinge and electrical connector features eliminate discrete parts and assembly processes.

As is evident from the foregoing description, certain aspects of the invention are not limited to the particular details of the examples illustrated, and it is therefore contemplated that other modifications and applications will occur to those skilled in the art. For example, while polypropylene is preferred because it is relatively inexpensive, other polymers can be used and filled with additives to impart the desired physical properties. It is accordingly intended that the claims shall cover all such modifications and applications as do not depart from the true spirit and scope of the invention.

What is claimed is:

1. An integrated lighting assembly, comprising:

an injection molded housing having a base, a cover and a substrate intermediate said base and cover;

an electrical circuit formed on said substrate;

a lighting element attached to said substrate and receiving power from said electrical circuit;

a reflective cone associated with said lighting element to intensify light emanating from said lighting element wherein said reflective cone has a first cone section formed in said base adjacent said substrate and a second cone section formed in said cover adjacent said substrate; and a reflective wall on one of said base and said cover receiving light emanating from said reflective cone.

2. An integrated lighting assembly, as set forth in claim 1, including:

a first fastening element formed on said base;

a second fastening element formed on said cover, said first and second fastening elements being mateable with one another to fasten said cover to said base.

3. An integrated lighting assembly, as set forth in claim 1, including a diffuser lens formed on one of said base and said cover, said diffuser lens receiving intensified light from said reflective cone and transmitting diffused light to said reflective wall.

4. An integrated lighting assembly, as set forth in claim 3, wherein said reflective cone has a first cone section formed in said base adjacent said substrate and a second cone section formed in said cover adjacent said substrate, said first cone section lying between said diffuser lens and said substrate.

5. An integrated lighting assembly, as set forth in claim 1, including a first hinge pivotally connecting said base and substrate and a second hinge pivotally connecting said substrate and cover.

6. An integrated lighting assembly, as set forth in claim 1, wherein said electrical circuit includes a layer of metal selectively deposited onto said substrate.

7. An integrated lighting assembly, as set forth in claim 1, wherein said reflective wall includes a layer of metal deposited onto a portion of said base and said reflector cone includes a layer of metal deposited onto a surface of said cone.

8. An integrated lighting assembly, comprising:

an injection molded housing having a base with first fastening elements formed thereon, a cover with second fastening elements thereon, and a substrate intermediate said base and cover, said first and second fastening elements being mateable with one another to fasten said cover to said base;

an electrical circuit formed on said substrate;

a lighting element attached to said substrate and receiving power from said electrical circuit;

a reflective cone associated with said lighting element to intensify and direct light in a predetermined pattern, said reflective cone having a first cone section formed in said base adjacent said first living hinge and a second cone portion formed in said cover adjacent said second living hinge; and a reflective wall on said base reflecting light emanating from said reflective cone in a predetermined pattern.

9. An integrated lighting assembly, as set forth in claim 8, including a diffuser lens formed on said base adjacent said first cone section, said first cone section lying between said diffuser lens and said first living hinge.

10. An integrated lighting assembly, as set forth in claim 8, wherein said housing is formed of 20% talc filled polypropylene.

11. An integrated lighting assembly, as set forth in claim 8, wherein said reflective wall includes a layer of metal deposited onto a portion of said base.

12. An integrated lighting assembly, as set forth in claim 8, wherein said electrical circuit includes a layer of metal selectively deposited onto said substrate.

13. An integrated lighting assembly, as set forth in claim 8, wherein said reflector cone includes a layer of metal deposited onto a surface of said cone.

14. A method for forming an integrated automotive lighting assembly, comprising the steps of:

forming a housing by injection molding a thermoplastic material, said housing having a base with first fastening elements formed thereon, a cover with second fastening elements thereon, and a substrate intermediate said base and cover;

selectively depositing metal onto said housing and forming an electrical circuit on said substrate, a first reflective cone section on said base, a second reflective cone section on said cover, and a reflective wall on said base;

connecting a lighting element to electrical circuit; and folding said cover onto said base causing said first and second cone sections to form a cone and causing said first and second fastener elements to mate.

15. A method, as set forth in claim 14, including the step of forming a diffuser lens on one of said base and cover while forming said housing.

16. A method, as set forth in claim 14, wherein the step of forming a housing includes forming a first hinge pivotally connecting said base and substrate and forming a second hinge pivotally connecting said substrate and cover.

17. A method, as set forth in claim 14, wherein the step of forming a housing includes injecting 20% talc filled polypropylene.

18. A method, as set forth in claim 14, wherein the step of depositing metal includes depositing metal using evaporative metal deposition.

19. A method, as set forth in claim 14, wherein the step of connecting the lighting element to the electrical circuit includes ultrasonically welding said lighting element and forming a mechanical bond.

20. A method, as set forth in claim 14, wherein the step of connecting the lighting element to the electrical circuit includes bonding with an electrically conductive adhesive and forming an electrical interconnection between said lighting element and said electrical circuit.

* * * * *